May 9, 1944.   G. S. HOUGHLAND   2,348,681
STABILIZING HYDROCARBONS
Filed June 14, 1941
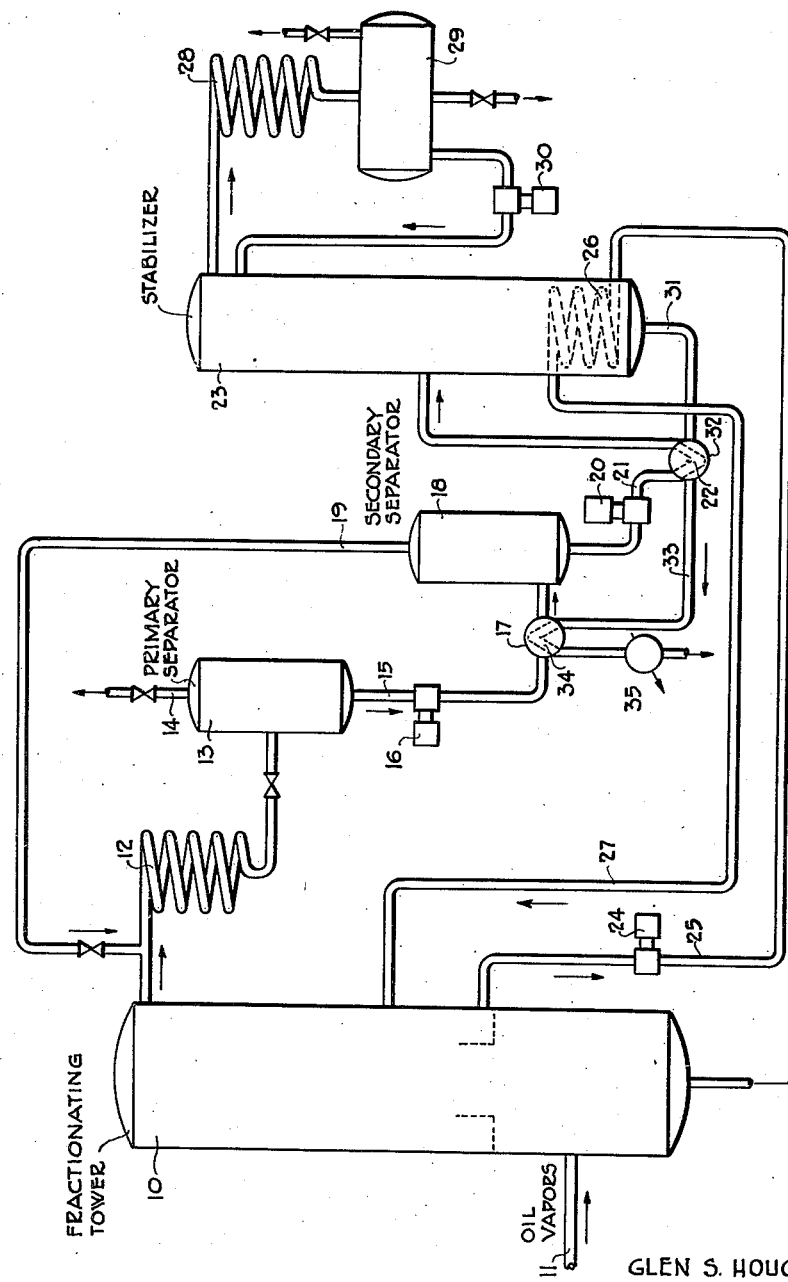
GLEN S. HOUGHLAND
INVENTOR
BY *J. M. Donaldson*
ATTORNEY Patented May 9, 1944

2,348,681

UNITED STATES PATENT OFFICE 2,348,681

STABILIZING HYDROCARBONS

Glen S. Houghland, New York, N. Y., assignor to Gasoline Products Company, Inc., Jersey City, N. J., a corporation of Delaware Application June 14, 1941, Serial No. 398,097

3 Claims. (Cl. 196—11)

This invention relates to the fractionation and stabilization of hydrocarbons and has particular reference to the stabilization or rectification of light distillates obtained in pressure cracking operations.

In accordance with the invention cracked vapors are subjected to fractionation to separate lighter vapors, such as gasoline or naptha vapors, from higher boiling constituents, these lighter vapors are cooled to effect condensation and a primary separation or release of normally gaseous hydrocarbons is effected under superatmospheric pressure. The distillate from which the gases have been removed is heated and subjected to a further separation into gaseous and liquid components without reduction in pressure and the separated liquid is then subjected to rectification under superatmospheric pressure to effect the desired stabilization. In the primary separation of normally gaseous constituents which takes place after the cooling and condensing of the gasoline vapors the pressure is sufficiently high that the normally gaseous constituents removed from the distillate will consist predominantly of hydrogen, methane and $C_2$ hydrocarbons while minimum proportions of $C_3$ and $C_4$ hydrocarbons will be released with the gases. In the second separation which takes place after moderate heating and without reduction in pressure the released gases will include the greater portion of the $C_2$ and lower boiling constituents which remained in the distillate after the primary separation and only comparatively moderate proportions of $C_3$ and $C_4$ hydrocarbons with the result that when the liquid from the second separating step is subjected to rectification in a rectifying or stabilizing column there will be comparatively small proportions of $C_2$ and lighter hydrocarbons present so that a much sharper separation of such normally gaseous hydrocarbons as it is undesired to include in the liquid distillate may be accomplished.

The invention will be fully understood by reference to the accompanying drawing which is a flow diagram showing apparatus suitable for carrying out the process of the invention.

Referring to the drawing, the numeral 10 indicates a fractionating tower such as a bubble tower which receives vapors and gases through a line 11 from a cracking still or evaporator of a pressure cracking system. In the tower 10 fractionation takes place to separate gasoline or naphtha vapors from higher boiling hydrocarbon oils. The separated vapors pass to a cooling coil 12 wherein condensation of the normally liquid hydrocarbons is effected and the resultant mixture of condensate and uncondensed constituents passes to a gas separator 13 wherein separation between liquid constituents and gaseous constituents takes place. The separated gases are removed through a gas line 14 and the liquid is withdrawn through a line 15 and directed by a pump 16 through a heat exchange element 17 to a secondary gas separator 18. Superatmospheric pressure is maintained in the separator 18 and in fact the pressure is preferably higher than the pressure obtaining in the primary separator 13. A further separation of normally gaseous constituents takes place in the separator 18. The separated gases are cycled through a line 19 to the bubble tower 10 or to a point in the system ahead of the condenser coil 12.

The separated liquid is withdrawn from the separator 18 by a pump 20 and directed through a line 21 and heat exchange element 22, thence to a stabilizing or rectifying tower 23. The tower 23 is equipped with bubble trays or the like for effecting efficient fractionation. For supplying additional heat to accomplish the desired rectification hot condensate may be drawn from the bubble tower 10 by pump 24 and directed through a line 25 to a reboiler coil 26. The condensate, after the heat exchange in the reboiler coil 26, may be returned through a line 27 to the bubble tower 10. The rectification in the tower 23 is conducted under superatmospheric pressure. The overhead gases pass to a cooling and condensing coil 28 thence to a receiving drum or gas separator 29 wherein normally gaseous constituents are separated as a condensate from uncondensed constituents. A portion of the distillate may be directed by a pump 30 to the tower 23 as a reflux therefor. Stabilized gasoline distillate is withdrawn from the tower 23 through a line 31, thence through an element 32 in heat exchange with element 22, thence through a line 33 to an element 34 in heat exchange with element 17 and thence through a final cooler 35.

In practicing the invention fractionation is carried on in the tower 10 under pressures of the order of 200 to 400 lbs. and the temperature of the overhead stream of vapors and gases is controlled to take off a distillate of the desired end point. The vapors flowing through the coil 12 are subjected to sufficient cooling to condense substantially all of the normally liquid hydrocarbons together with a portion of the normally gaseous hydrocarbons. The primary separation of gases from liquid distillate is conducted in the separator 13 under pressures of the order of 200 to 300 lbs. and at temperatures approximating 90° F.–110° F. Under these conditions the gases released through the vapor line 14 will consist predominantly of hydrogen, methane and $C_2$ hydrocarbons with minimum proportions of higher boiling hydrocarbons. The liquid from this primary separation is heated to a temperature of about 150° F.–200° F. without any reduction in pressure and preferably with about 10–25 lbs. increase in pressure. Under these conditions the $C_2$ and lighter hydrocarbons which remained in the liquid removed from the primary separator 13 will be largely removed from the liquid collecting in the secondary separator 18 and such higher boiling components as may be included with the recycled gases will be retained in the system by reason of the recycling. The liquid withdrawn from the secondary separator 18, freed from the bulk of the $C_2$ and lighter hydrocarbons, is subjected to heating in the heat exchanger 22 and directed to the stabilizer 23 wherein rectification takes place under increased pressures generally of the order of 300 to 350 lbs. to produce a distillate product of desired vapor pressure.

In an example of the invention cracked vapors are subjected to fractionation to take off from the bubble tower a 400° F. end point fraction. The overhead vapors are subjected to cooling to condense substantially all the liquid components and the cooled and condensed products are collected in the primary separator at a temperature of 100° F. under 250 lbs. pressure. The liquid distillate is withdrawn from the separator and heated under an increase in pressure and the products are collected in the secondary separator at a temperature of 160° F. under 265 lbs. pressure, the separated gases from the secondary separator being recycled to the condenser. The distillate from the secondary separator is passed to the stabilizer wherein it is subjected to rectification under a pressure of 335 lbs. The bottom temperature of the stabilizer is 468° F. and the overhead from the stabilizer is cooled to 100° F. A stabilized product of 400° F. end point and of 8 lbs. Reid vapor pressure is withdrawn from the stabilizer. With a bottom temperature of 447° F. a product of 12 lbs. Reid vapor pressure is produced.

The invention has an important advantage over the prior practice in that for a given pressure in the stabilizing step the reflux temperature may be higher. The beneficial function of this increased temperature of the reflux is that for a given pressure, the upper limit of which is determined by such variables as the critical temperature, the temperature of the heating medium for the stabilizer or the maximum bottom temperature at which the gasoline is not discolored, the higher reflux temperature will permit condensing the reflux without taking off butane with the exit gases.

Although a preferred embodiment of the invention has been described herein, it will be understood that various changes and modifications may be made therein, while securing to a greater or less extent some or all of the benefits of the invention, without departing from the spirit and scope thereof.

I claim:

1. In the fractionation of hydrocarbons, the process that comprises subjecting hydrocarbon vapors comprising normally liquid and normally gaseous hydrocarbons to fractionation under superatmospheric pressure to separate higher boiling oils from uncondensed vapors and gases, cooling the separated vapors and gases in a cooling zone under superatmospheric pressure to condense substantially all the normally liquid hydrocarbons and $C_3$ and $C_4$ hydrocarbons, passing the resultant cooled products to a separating zone wherein separation into normally gaseous constituents and liquid distillate takes place without rectification, maintaining sufficient superatmospheric pressure in said separating zone as to effect retention of substantially all the normally liquid hydrocarbons in the liquid distillate and so that the separated gaseous constituents consist essentially of the lighter normally gaseous constituents, directing the separated liquid distillate to a heating zone wherein it is subjected to moderate heating, passing the resultant heated products to a second separating zone wherein a further separation of normally gaseous constituents from liquid takes place without rectification maintaining a higher pressure in the latter separating zone adequate to effect retention of substantially all the normally liquid hydrocarbons in the liquid and so that the separated gaseous constituents consist essentially of lighter normally gaseous hydrocarbons, recycling the latter normally gaseous constituents to said cooling zone and passing said liquid to a stabilizing zone wherein it is subjected to rectification under superatmospheric pressure to produce a liquid product of desired vapor pressure.

2. In the recovery of a stabilized gasoline product from a pressure cracking operation, the process that comprises subjecting evolved vapors including normally liquid and normally gaseous hydrocarbons to fractionation under superatmospheric pressure to separate higher boiling oils from uncondensed gasoline vapors and gases, cooling the separated vapors and gases under a superatmospheric pressure not materially below 200 lbs. to condense substantially all the normally liquid hydrocabons and $C_3$ and $C_4$ hydrocarbons, passing the resultant cooled products to a separating zone wherein separation into normally gaseous constituents and liquid distillate takes place without rectification, maintaining said separating zone under a superatmospheric pressure not materially below 200 lbs. so that the released gases consist essentially of $C_2$ and lighter gases with only minor proportions of the $C_3$ and $C_4$ gases, directing the separated liquid distillate to a heating zone wherein it is heated to a temperature of the order of 150° F.–200° F., passing the resultant heated products to a second separating zone wherein a further separation of normally gaseous constituents from liquid takes place without rectification, maintaining the second separating zone under a higher pressure than the first separating zone so that substantially all of the $C_3$ and $C_4$ gases are retained in the liquid distillate and the greater portion of the $C_2$ and lighter gases is released, recycling the normally gaseous constituents released in the second separating zone to said cooling zone, directing the separated liquid from the second separating zone to a heating zone wherein it is heated to a higher temperature than in the first heating zone and subjecting the heated products to rectification under a pressure higher than in the second separating zone to thereby produce a gasoline product of desired vapor pressure.

3. In the recovery of a stabilized gasoline product from a pressure cracking operation, the process that comprises subjecting evolved vapors including normally liquid and normally gaseous hydrocarbons to fractionation under superatmospheric pressure to separate higher boiling oils from undcondensed gasoline vapors and gases, cooling the separated vapors and gases under superatmospheric pressure to a temperature of the order of 90° F.–110° F. to condense substantially all of the gasoline hydrocarbons, passing the resultant cooled products to a separating zone wherein separation into normally gaseous constituents and liquid distillate takes place without rectification, maintaining said separating zone under a superatmospheric pressure not materially below 200 lbs. so that the released gases consist essentially of $C_2$ and lighter gases with only minor proportions of the $C_3$ and $C_4$ gases, directing the separated liquid distillate to a heating zone wherein it is heated to a temperature of the order of 150° F.–200° F., passing the resultant heated products to a second separating zone wherein a further separation of normally gaseous constituents from liquid takes place without rectification, maintaining the second separating zone under a pressure of about 10–25 lbs. higher than that of the first separating zone so that substantially all of the $C_3$ and $C_4$ gases are retained in the liquid distillate and the greater portion of the $C_2$ and lighter gases is released, recycling the latter normally gaseous constituents to said cooling zone, directing the separated liquid to a heating zone wherein it is heated to a higher temperature than in the first heating zone and subjecting the heated products to rectification under a pressure higher than in the second separating zone to thereby produce a gasoline product of desired vapor pressure.

GLEN S. HOUGHLAND.